United States Patent
Park et al.

(10) Patent No.: US 7,554,951 B2
(45) Date of Patent: Jun. 30, 2009

(54) METHOD, APPARATUS AND SYSTEM FOR CONTROLLING ARQ-RELATED TIMERS IN BROADBAND WIRELESS ACCESS COMMUNICATION SYSTEM

(75) Inventors: Sung-Wook Park, Seongnam-si (KR); Hye-Yeon Jeong, Suwon-si (KR); Jeong-Hoon Park, Yongin-si (KR); Ae-Ri Lim, Anyang-si (KR)

(73) Assignee: Samsung Electronics Co., Ltd. (KR)

(*) Notice: Subject to any disclaimer, the term of this patent is extended or adjusted under 35 U.S.C. 154(b) by 519 days.

(21) Appl. No.: 11/321,148

(22) Filed: Dec. 29, 2005

(65) Prior Publication Data
US 2006/0146753 A1 Jul. 6, 2006

(30) Foreign Application Priority Data
Jan. 5, 2005 (KR) .................. 10-2005-0000976

(51) Int. Cl.
*H04B 7/212* (2006.01)
(52) U.S. Cl. ....................... 370/331; 455/436
(58) Field of Classification Search ............. 370/331, 370/329, 392, 470, 335, 442, 342; 455/450.442, 455/552
See application file for complete search history.

(56) References Cited

U.S. PATENT DOCUMENTS

| 7,000,021 | B1 * | 2/2006 | Radhakrishnan et al. .... 709/230 |
| 7,146,171 | B2 * | 12/2006 | Tang et al. ............... 455/450 |
| 7,269,420 | B2 * | 9/2007 | Heo et al. ................ 455/436 |
| 2005/0094600 | A1 * | 5/2005 | Zhang et al. ............. 370/331 |
| 2006/0120323 | A1 * | 6/2006 | Ye et al. ................. 370/329 |

\* cited by examiner

*Primary Examiner*—Ajit Patel
(74) *Attorney, Agent, or Firm*—The Farrell Law Firm, LLP

(57) ABSTRACT

A method of controlling automatic retransmission request (ARQ)-related timers in a broadband wireless access communication system is disclosed, by which reliability of a wireless link can be increased and the ARQ-related timers can be properly operated even in a handover situation. A mobile subscriber station temporarily stops an operation of the ARQ-related timers by informing a base station of a handover start when a handover situation occurs and restarts the stopped ARQ-related timers when the handover situation is finished.

12 Claims, 4 Drawing Sheets

METHOD, APPARATUS AND SYSTEM FOR CONTROLLING ARQ-RELATED TIMERS IN BROADBAND WIRELESS ACCESS COMMUNICATION SYSTEM

PRIORITY

This application claims priority under 35 U.S.C. § 119 to an application entitled "Method, Apparatus and System for Controlling ARQ-Related Timers in Broadband Wireless Access Communication System" filed in the Korean Intellectual Property Office on Jan. 5, 2005 and assigned Serial No. 2005-976, the contents of which are incorporated herein by reference.

BACKGROUND OF THE INVENTION

1. Field of the Invention

The present invention relates generally to a broadband wireless access communication system, and in particular, to a method, apparatus and system for controlling automatic retransmission request (ARQ)-related timers in a broadband wireless access communication system during a handover situation.

2. Description of the Related Art

In addition to the rapid progress in the level of performance of mobile subscriber stations and the rapid increase in a data rate of communication networks, the use of a relatively high-speed data communication function is being remarkably emphasized. In particular, receiving and reproduction of multimedia, or to permit watching of terrestrial television broadcasting programs using the mobile subscriber stations, requires a very fast data service rate.

This type of data communication is achieved by controlling data flow between a mobile subscriber station and a communication network, wherein the mobile subscriber station sends an acknowledgement signal ACK in response to received packet data and defines a time limit (timeout) for waiting for a return acknowledgement signal ACK. In particular, as a data communication rate of the mobile subscriber station is increased, to confirm stable data transmission, a sender should receive the acknowledgement signal ACK from a recipient and uses the timeout period to determine the time for waiting for the acknowledgement signal ACK. Thus, if the acknowledgement signal ACK does not exist within the determined timeout period, the sender generally performs retransmission. This technique is called an automatic retransmission request (ARQ) scheme.

As described above, as a data transmission method between a mobile subscriber station and a network, the mobile subscriber station basically sends the acknowledgement signal ACK as soon as receiving single data, and for most wireless data communications, since a delay time is relatively long due to system characteristics, the acknowledgement signal ACK should be transmitted to a sender every time data is received.

Thus, when joining a communication network managed by a base station, each mobile subscriber station performs an initial registration process, establishes a plurality of connections, and determines ARQ-related timers to be used for each connection when opening the connection. In the ARQ scheme, fixed retransmission timer values are always used, and if the fixed retransmission timers are set to a small value, there is a limit to guarantee reliability, and if the fixed retransmission timers are set to a large value, a delay and a delay variation largely increase.

The ARQ-related timers will be described in detail with reference to the 6.3.4 ARQ mechanism of the Institute of Electrical and Electronics Engineers (IEEE) 802.16d specification. However, the ARQ-related timers operate only in a normal state, and there is a problem in that a handover situation is not considered in use. Thus, if the handover situation occurs in a mobile subscriber station, a case where the mobile subscriber station waits to receive an acknowledgement signal for previously transmitted packet data may occur. Likewise, if a state of receiving data from a base station is bad, or if feedback for packet data transmitted to an upstream link cannot be received, an ARQ window does not move anymore (i.e., the window cannot be time-shifted) and an ARQ synchronization (sync) loss timeout period, which is a timer related to ARQ sync matched between the mobile subscriber station and the base station, expires, thereby resetting the ARQ timer.

To prevent this situation, if the ARQ sync loss timeout period is set for a long period of time considering handover latency, in a normal state, there is a problem that if sync loss between a sender and a recipient occurs, it will be discovered late. On the contrary, if the ARQ sync loss timeout period of the ARQ-related timers is set too short without considering the handover latency, resetting of the ARQ timer occurs too frequently.

In a state where the handover situation is maintained, besides the ARQ sync loss timeout period, if an ARQ retry timeout period expires, even if the recipient has not received packet data, the sender will retransmit the packet data. Accordingly, if the ARQ retry timeout period is set for a long time period considering the handover latency, retransmission begins late in a case where feedback does not return in a normal state, and on the contrary, if the ARQ retry timeout period is set short, retransmission frequently occurs.

In a case of ARQ block lifetime, which is a maximum time interval taken to transmit one ARQ block, of the ARQ-related timers, when the ARQ block lifetime expires, a corresponding ARQ block is discarded. If the ARQ block lifetime is set for too short a time period, the corresponding ARQ block is discarded without being sufficiently retransmitted, and on the contrary, if the ARQ block lifetime is set for too long a time period considering the handover latency, a buffer overflow will frequently occur.

As described above, since fixed ARQ-related timers are always used in the conventional ARQ scheme, a state change of a communication network, e.g., a handover situation, cannot be efficiently dealt with. Thus, in the conventional ARQ scheme, if the ARQ-related timers are set to a small value, there is a limit to guarantee reliability, and if the ARQ-related timers are set to a large value, a delay and a delay variation largely increase.

SUMMARY OF THE INVENTION

Accordingly, an object of the present invention is to provide a method, apparatus and system for controlling automatic retransmission request (ARQ)-related timers in a broadband wireless access communication system, by which reliability of a wireless link can be increased and the ARQ-related timers can be properly operated even in a handover situation.

According to one aspect of the present invention, there is provided a broadband wireless access communication system for controlling automatic retransmission request (ARQ)-related timers, the system including a mobile subscriber station for performing a handover by stopping the ARQ-related timers while simultaneously transmitting a message to indicate of a handover start when the handover begins and restarting the stopped ARQ-related timers when a network entry process with a target base station is finished; and the target base station for stopping the ARQ-related timers as soon as the message is received from the mobile subscriber station and restarting the stopped ARQ-related timers when the network entry process is finished.

According to another aspect of the present invention, there is provided a method of controlling automatic retransmission request (ARQ)-related timers in a broadband wireless access communication system, the method including transmitting, by a mobile subscriber station, a message indicating a handover start during communication with a serving base station; stopping the ARQ-related timers in the mobile subscriber station when the message is transmitted; performing, by the mobile subscriber station, an initial ranging process with a target base station in a state of stopping the ARQ-related timers; performing a registration process after the initial ranging process is finished; and restarting the stopped ARQ-related timers when the registration process is finished.

According to another aspect of the present invention, there is provided an apparatus for controlling automatic retransmission request (ARQ)-related timers in a broadband wireless access communication system including a serving base station, a target base station, and a mobile subscriber station, the apparatus including the ARQ related timers; a transmitter for transmitting a message indicating a handover start when a handover situation occurs; and a controller for stopping the ARQ related timers and performing the handover.

According to another aspect of the present invention, there is provided a method of controlling automatic retransmission request (ARQ)-related timers in a broadband wireless access communication system including a serving base station, a target base station, and a mobile subscriber station, the method including transmitting a message indicating a handover start to the serving base station or the target base station when a handover situation occurs and stopping the ARQ related timers; and performing a network entry process with the target base station after the handover is finished and restarting the ARQ related timers when the network entry process is finished.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
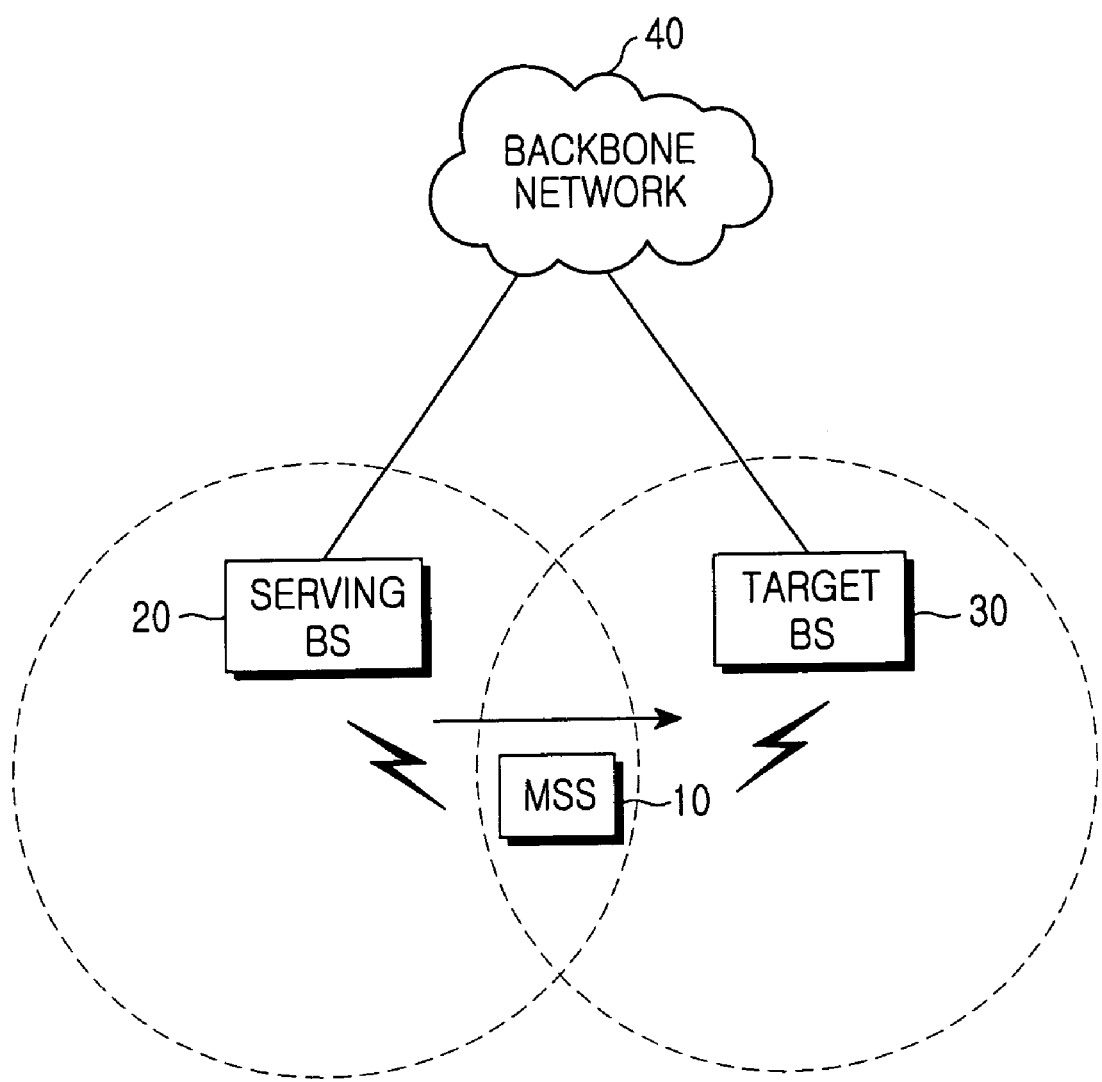
FIG. 1 is a schematic diagram of a broadband wireless access communication system according to a preferred embodiment of the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

In embodiments of the present invention, there is provided a method of controlling automatic retransmission request (ARQ)-related timers in a broadband wireless access communication system in which reliability of a wireless link can be increased even in a handover situation and the ARQ-related timers can be properly operated. To do this, a function is implemented which temporarily stops the operating ARQ-related timers by informing a base station that a handover begins when a handover situation occurs and restarting the stopped ARQ-related timers when the handover situation is finished. According to the embodiments of the present invention, by smoothly synchronizing the mobile subscriber station and the base station using the inventive method, problems, such as a decrease of reliability, a delay, and a delay variation, that can be generated by desynchronization between a mobile subscriber station and a base station due to operation of ARQ-related timers during the handover can be prevented, and optimized ARQ-related timers can be provided regardless of a network state change such as a change from the handover situation to a normal state.

FIG. 1 is a schematic diagram of a broadband wireless access (BWA) communication system according to a preferred embodiment of the present invention. Referring to FIG. 1, the broadband wireless access communication system includes a backbone network 40, a plurality of base stations 20 and 30, and a mobile subscriber station (MSS) 10. The mobile subscriber station 10 has mobility, i.e., moves between the serving base station 20 and the target base station 30 and is connected to the backbone network 40 through each base station 20 or 30. The base stations 20 and 30 provide control, management, and connectivity to the mobile subscriber station 10 and are identified as a serving base station 20 and a target base station 30 based on their roles with respect to the mobile subscriber station 10. That is, a base station taking charge of management of information on the mobile subscriber station 10 and data transmission with the backbone network 40 is the serving base station 20 for the mobile subscriber station 10, and a base station to which the mobile subscriber station 10 moves and through which data of the mobile subscriber station 10 is transmitted and received is the target base station 30.

To satisfy efficient performance of a link layer, it is most important to determine proper ARQ-related timers. The ARQ-related timers used in the embodiments of the present invention include ARQ block lifetime, ARQ retry timeout, and ARQ sync loss timeout timers. The ARQ block lifetime, the ARQ retry timeout, and the ARQ sync loss timeout timers will be schematically described below with reference to the IEEE 802.16d 6.3.4 ARQ related specification.

The ARQ block lifetime is a maximum time interval taken for one ARQ block to be managed by a transmitter ARQ state machine. In detail, the ARQ block lifetime is the time taken to empty a predetermined buffer in which data to be transmitted is occupied and starts to be counted when an ARQ block is initially transmitted. If an acknowledgement signal is not received from a recipient within the ARQ block lifetime when an ARQ block is transmitted or retransmitted, the ARQ block is discarded.

The ARQ retry timeout is determined according to a processing delay generated by a sender or a recipient and another delay related to a system. Thus, if feedback of one block is not received after the block is transmitted, retransmission is performed after the time corresponding to the ARQ retry timeout.

The ARQ sync loss timeout is a maximum time interval for which an ARQ transmission window start or an ARQ reception window start can maintain the same value before it is determined that synchronization between a transmitter ARQ state machine and a receiver ARQ state machine is lost when data transmission is in an active state. In other words, in a sender, the ARQ sync loss timeout is reset every time the ARQ transmission window start is updated. On the contrary, in a recipient, when a received block is matched to the ARQ reception window start, the ARQ sync loss timeout is reset.

However, the ARQ-related timers cannot efficiently deal with a network state change. In particular, if the ARQ-related timers are set without considering a handover situation in a mobile subscriber station, a problem by which performance of a link layer can be dramatically decreased, such as retransmission being performed several times, is generated.

To solve this problem, there is a need for a method of transmitting data that guarantees synchronization between a mobile subscriber station and a base station even if there is a network state change such as a handover situation in addition to a normal state. Thus, an algorithm for controlling the ARQ-related timers to synchronize the mobile subscriber station and the base station is necessary.

Figure 2:
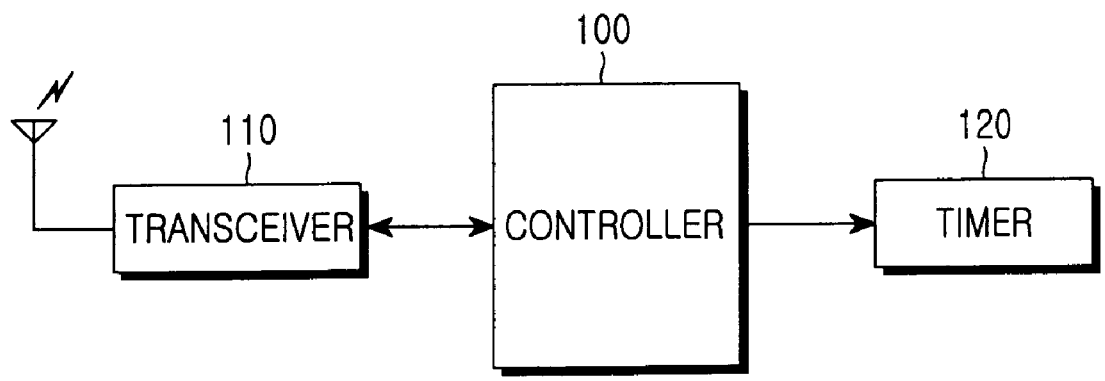
FIG. 2 is a schematic block diagram of a mobile subscriber station performing a function of controlling ARQ-related timers according to a preferred embodiment of the present invention.

FIG. 2 is a schematic block diagram of a mobile subscriber station performing a function of controlling ARQ-related timers according to a preferred embodiment of the present invention. Referring to FIG. 2, a controller 100 performs a general control operation of the mobile subscriber station. In particular, according to the present embodiment, even during a handover situation, if the controller 100 recognizes that the handover situation occurs while synchronization with a base station is maintained, the controller 100 controls the ARQ-related timers to stop the timers. In other words, the controller 100 prevents the ARQ-related timers from being unnecessarily counted during a waiting time in the handover situation. When the handover situation is finished, the controller 100 informs the base station that the handover situation is finished, thereby simultaneously operating the ARQ-related timers in the mobile subscriber station and the base station, causing counting of the ARQ-related timers in a synchronized state. Accordingly, the ARQ-related timers are counted only in a normal state, and if there is an unstable state change in a network, the mobile subscriber station recognizes this state change and controls the ARQ-related timers to stop the timers until the network returns to the normal state. When the network returns to the normal state, the mobile subscriber station controls the ARQ-related timers to restart. In the present embodiment, the description is limited to an operation control of the ARQ-related timers according to a network state change, which is performed by a mobile subscriber station. However, it is preferred that the control of the ARQ-related timers can be also performed by a base station.

A transceiver 110 transmits/receives a radio frequency (RF) signal to/from a base station through an antenna under control of the controller 100. A timer 120 generates needed time data under control of the controller 100, and the generated time data is used for a counting operation for a predetermined time. In the present embodiment, the timer 120 generates time data for the ARQ-related timers to be counted in synchronization with a base station and provides the generated time data to the controller 100. The controller 100 controls the transceiver 110 to transmit/receive data to/from the base station by synchronizing with the base station based on the ARQ-related timers such as the ARQ block lifetime, the ARQ retry timeout, and the ARQ sync loss timeout.

Figure 3:
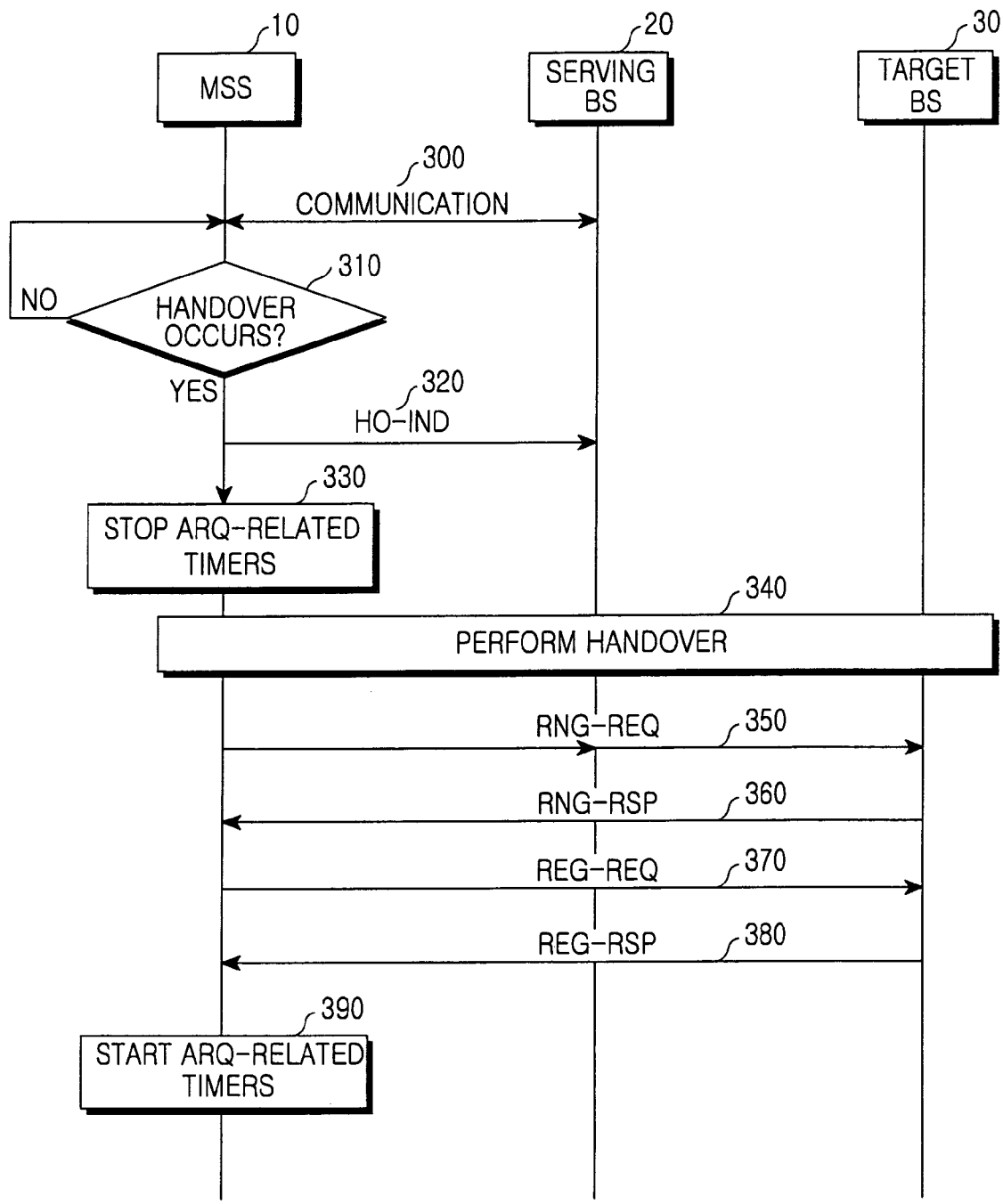
FIG. 3 is a signaling diagram illustrating an ARQ-related timer controlling process between a mobile subscriber station and base stations when a handover situation occurs according to a preferred embodiment of the present invention.

A detailed example to which a preferred embodiment of the present invention is applied will now be described with reference to FIG. 3. FIG. 3 is a signaling diagram illustrating an ARQ-related timer controlling process between a mobile subscriber station and base stations when a handover situation occurs according to a preferred embodiment of the present invention.

Referring to FIG. 3, in a state in which the mobile subscriber station (MSS) 10 is connected to the serving base station 20 in step 300, the mobile subscriber station 10 determines whether a handover situation occurs in step 310. As a result of the determination, if a handover is necessary, the mobile subscriber station 10 transmits a handover indication (HO-IND) message indicating the handover situation to the serving base station 20 in step 320. The mobile subscriber station 10 informs the serving base station 20 of the timing of a handover start using the HO-IND message, and simultaneously, in step 330, the mobile subscriber station 10 stops the ARQ-related timers. That is, the mobile subscriber station 10 regards the time when the HO-IND message is transmitted to the serving base station 20 as the handover start time. Accordingly, the serving base station 20 regards the time when the HO-IND message is received as the handover start time.

When the handover begins, the mobile subscriber station 10 stops a counting operation for the ARQ block lifetime, the ARQ retry timeout, and the ARQ sync loss timeout timers, which are the ARQ-related timers of the MSS 10. Simultaneously, the serving base station 20 recognizing the handover start time, stops a counting operation for the ARQ sync loss timeout and ARQ RX purge timeout timers, which are the ARQ-related timers of the serving BS 20.

When the ARQ-related timers simultaneously stop in both the mobile subscriber station 10 and the serving base station 20, the mobile subscriber station 10 performs the handover in step 340. When the handover is finished, the mobile subscriber station 10 performs a network entry process with the target base station 30. To perform the network entry process, the mobile subscriber station 10 performs an initial ranging process with the target base station 30 in a state where the ARQ-related timers are stopped. In detail, to inform the serving base station 20 and the target base station 30 that the mobile subscriber station 10 is in a state where data transmission/reception is possible, the mobile subscriber station 10 transmits a ranging request (RNG-REQ) message, which is a request message for synchronizing between the mobile subscriber station 10 and the base stations 20 and 30, to the serving base station 20 and the target base station 30 in step 350. The mobile subscriber station 10 receives a ranging response (RNG-RSP) message, which is a response message responding to the RNG-REQ message, from the target base station 30 in step 360. The mobile subscriber station 10 synchronizes with the base stations 20 and 30 using the RNG-RSP message.

Contents indicating 'HO process optimization' constructed in a TLV (type, length, and value) format can be included in the RNG-RSP message transmitted from the target base station 30 to the mobile subscriber station 10 during the handover. In the TLV format, for example, if a flag value is set to a 6th bit, i.e., Bit #6 is set, the serving base station 20 and the target base station 30 can share information such as ARQ, timer, counters, and MAC state machines. In addition, a fact that Bit #6 is set in the TLV format means that the serving base station 20 can transmit the information to the target base station 30. Thus, it is assumed in the present embodiment that the ARQ information of the serving base station 20 is transmitted to the target base station 30 since Bit #6 is set in the TLV format.

When the initial ranging process is finished, the mobile subscriber station 10 performs a registration process with the target base station 30 and restarts the stopped ARQ-related timers when the registration process is finished. The registration process will now be described. In step 370, the mobile subscriber station 10 transmits a registration request (REG-REQ) message for requesting information necessary to perform an operation of the mobile subscriber station 10 to the target base station 30. In step 380, the mobile subscriber station 10 receives a registration response (REG-RSP) message, which is a response message including various values necessary to the mobile subscriber station 10, i.e., parameters necessary to the operation of the mobile subscriber station 10, from the target base station 30 in response to the REG-REQ message. By doing this, the network entry process is finished, and then an operation for activating the ARQ-related timers stopped when the handover started is performed. In step 390, the mobile subscriber station 10 recognizes that the ARQ operation is possible as soon it receives the REG-RSP message and restarts the counting operation of the stopped ARQ-related timers. The target base station 30 also restarts the counting operation of the stopped ARQ-related timers as soon the REG-RSP message is transmitted.

Figure 4:
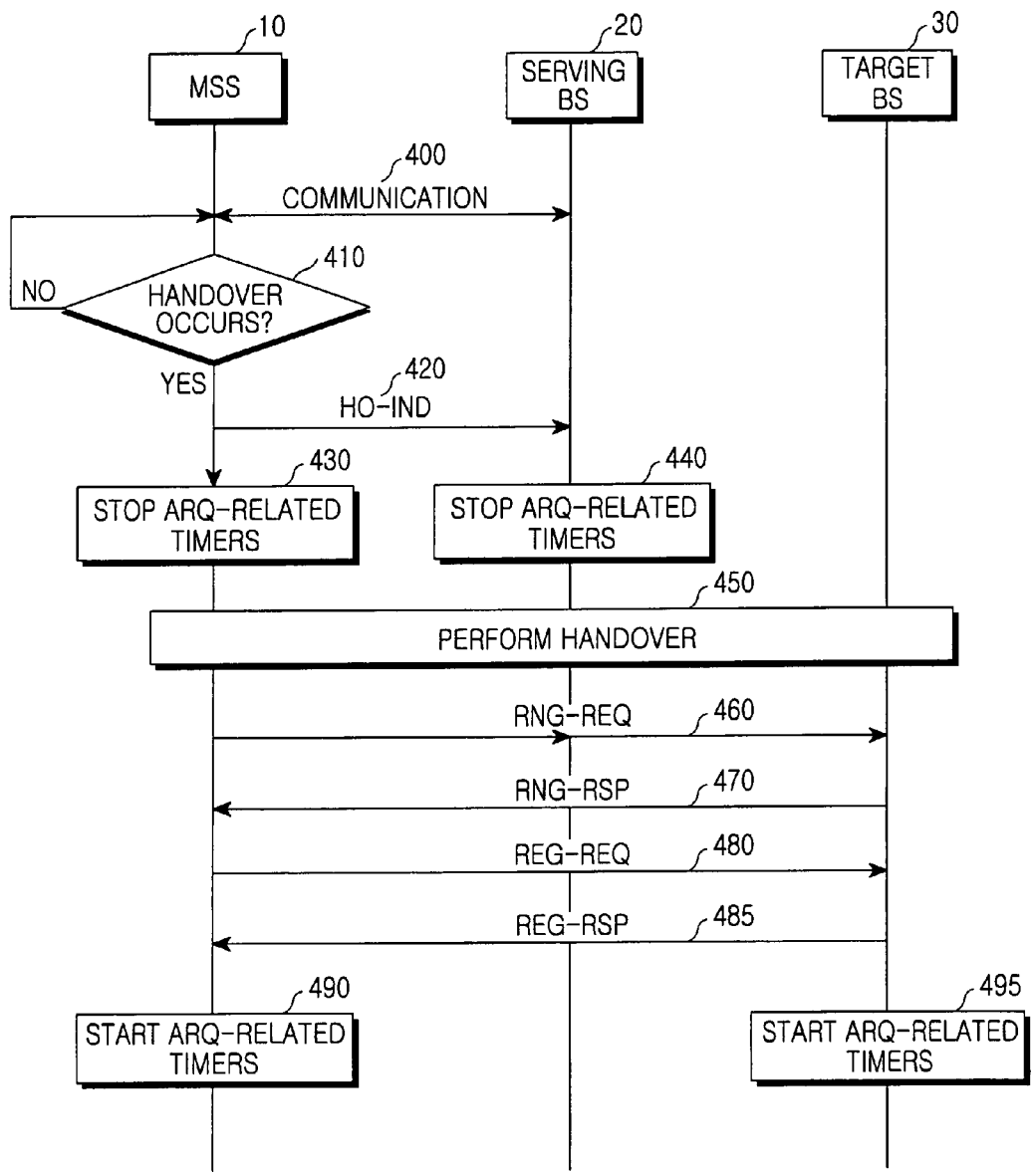
FIG. 4 is a signaling diagram illustrating an ARQ-related timer controlling process between a mobile subscriber station and base stations when a handover situation occurs according to another preferred embodiment of the present invention.

A process of controlling an operation of ARQ-related timers in a mobile subscriber station when a handover situation occurs has been described above. A process of controlling an operation of ARQ-related timers in base stations to use optimized ARQ-related timers in the base stations as well as a mobile subscriber station will now be described. FIG. 4 is a signaling diagram illustrating an ARQ-related timer controlling process between a mobile subscriber station and base stations when a handover situation occurs according to another preferred embodiment of the present invention.

Referring to FIG. 4, in a state in which the mobile subscriber station 10 is connected to the serving base station 20 in step 400, the mobile subscriber station 10 determines whether a handover situation occurs in step 410. As a result of the determination, if a handover is necessary, the mobile subscriber station 10 transmits an HO-IND message indicating a handover start to the serving base station 20 in step 420. While the HO-IND message being transmitted to the serving base station 20 is illustrated in FIG. 4, the mobile subscriber station 10 can transmit the HO-IND message to any one or both of the serving base station 20 and the target base station 30 when the handover situation occurs. In step 430, the mobile subscriber station 10 temporarily stops its own ARQ-related timers simultaneously with transmitting the HO-IND message. In step 440, the serving base station 20 or the target base station 30 (whichever has received the HO-IND message) temporarily stops its own ARQ-related timers simultaneously with receiving the HO-IND message, i.e., at the same time as when the ARQ-related timers of the mobile subscriber station 10 stop.

When the ARQ-related timers simultaneously stop in both the mobile subscriber station 10 and the serving base station 20 or the target base station 30, in step 450, the mobile subscriber station 10 performs the handover. When the handover is finished, the mobile subscriber station 10 performs a network entry process with the target base station 30. Since a process performed between the mobile subscriber station 10 and the base stations 20 and 30 according to the network entry process in steps 460 to 485 is identical to the process in steps 350 to 380 illustrated in FIG. 3, detailed description is omitted. The network entry process is finished when the mobile subscriber station 10 receives the REG-RSP message from the target base station 30 according to the network entry process, and then an operation for activating the ARQ-related timers that were stopped when the handover started is performed. In step 490, the mobile subscriber station 10 recognizes that the ARQ operation is possible as soon as receiving the REG-RSP message and restarts the counting operation of its stopped ARQ-related timers. In step 495, the serving base station 20 or the target base station 30 also restarts the counting operation of its stopped ARQ-related timers as soon the REG-RSP message is transmitted, e.g., at the same time as when the ARQ-related timers of the mobile subscriber station 10 restart.

As described above, since the length of the waiting time during a handover cannot be exactly predicted, in the embodiments of the present invention, both a mobile subscribe station and a base station stop their respective ARQ-related timers during a handover in order to prevent the problems of the prior art by setting the ARQ-related timers to a predetermined value and simultaneously restarting an operation of the ARQ-related timers after the handover is finished.

As described above, according to embodiments of the present invention, optimized ARQ-related timers can be used regardless of a network state change, e.g., either a normal state or a handover state, in a broadband wireless access communication system. In addition, an operation of ARQ-related timers can be optimized by stopping the operation of the ARQ-related timers in a mobile subscriber station and a base station when a handover occurs in order to prevent the mobile subscribe station from desynchronizing with the base station due to the occurrence of the handover, and the ARQ-related timers can be efficiently managed by simultaneously restarting the operation of the ARQ-related timers when the handover is finished.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A broadband wireless access communication system for controlling automatic retransmission request (ARQ)-related timers, the system comprising:
    a mobile subscriber station for performing a handover by stopping mobile subscriber station ARQ-related timers while simultaneously transmitting a message indicating a handover start and restarting the stopped mobile subscriber station ARQ-related timers when a network entry process is finished; and
    a target base station for stopping base station ARQ-related timers as soon as the message is received from the mobile subscriber station and restarting the stopped base station ARQ-related timers when the network entry process is finished.

2. The system of claim 1, wherein the mobile subscriber station transmits a handover indication (HO-IND) message indicating a handover start time to a serving base station when the handover is necessary.

3. The system of claim 2, wherein the serving base station regards the time when the HO-IND message is received from the mobile subscriber station as the handover start time and stops the base station ARQ-related timers.

4. The system of claims 1, wherein the ARQ-related timers in the mobile subscriber station include ARQ block lifetime, ARQ retry timeout, and ARQ sync loss timeout timers.

5. The system of claim 1, wherein the ARQ-related timers in the base station include ARQ retry timeout and ARQ RX purge timeout timers.

6. A method of controlling automatic retransmission request (ARQ)-related timers in a broadband wireless access communication system, the method comprising the steps of:
   transmitting, by a mobile subscriber station, a message indicating a handover start when a handover situation occurs during communication with a serving base station;
   stopping the ARQ-related timers in the mobile subscriber station when the message is transmitted;
   performing, by the mobile subscriber station a network entry process with a target base station while the ARQ-related timers are stopped; and
   restarting the stopped ARQ-related timers in the mobile station when the network entry process is finished,
   wherein the target base station stops ARQ-related timers in the target base station when the message indicating the handover start is received and restarts the stopped ARQ-related timers in the target base station when the ARQ-related timers in the mobile subscriber station restart.

7. The method of claim 6, wherein in the transmitting step, the mobile subscriber station transmits a handover indication (HO-IND) message indicating of a handover start time to the serving base station.

8. The method of claim 6, wherein the ARQ-related timers in the mobile subscriber station include ARQ block lifetime, ARQ retry timeout, and ARQ sync loss timeout timers.

9. The method of claim 6, wherein the ARQ-related timers in the base station include ARQ retry timeout and ARQ RX purge timeout timers.

10. A mobile subscriber station in an apparatus for controlling automatic retransmission request (ARQ)-related timers in a broadband wireless access communication system including a serving base station, a target base station, and the mobile subscriber station, the mobile subscriber station comprising:
    ARQ related timers;
    a transmitter for transmitting a message indicating a handover start when a handover situation occurs; and
    controller for stopping the ARQ related timers when the message is transmitted and restarting the stopped ARQ related timers when a network entry process with the target base station is finished,
    wherein the target base station starts its own ARQ related timers when the network entry process of the mobile subscriber station is finished.

11. The apparatus of claim 10, wherein the serving base station stops its own ARQ related timers by receiving the handover start message from the mobilesubscriber station.

12. The method of claim 6, wherein the message is transmitted to at least one of the serving base station and the target base station.

* * * * *